United States Patent [19]

Caldwell

[11] Patent Number: 4,619,286

[45] Date of Patent: Oct. 28, 1986

[54] ELEVATION RESPONSIVE AUTOMATIC VEHICLE CONTROL SYSTEM

[75] Inventor: Roland B. Caldwell, Worthington, Ohio

[73] Assignee: Ranco Incorporated, Dublin, Ohio

[21] Appl. No.: 609,808

[22] Filed: May 14, 1984

[51] Int. Cl.[4] ............................................. F02M 7/24
[52] U.S. Cl. ................................. 137/81.1; 261/39 A; 123/465; 60/602
[58] Field of Search .............................. 123/465, 587; 261/121 B, 39 A; 137/81.1; 60/602

[56] References Cited

U.S. PATENT DOCUMENTS

| 2,544,520 | 3/1951 | Ball | 137/81.1 |
| 2,608,200 | 8/1952 | Stockman | 137/81.1 |
| 3,987,131 | 10/1976 | Hisatomi et al. | 261/39 A |
| 4,108,197 | 8/1978 | Brakebill | 137/81.1 |
| 4,177,224 | 12/1979 | Yamanaka et al. | 261/39 A |

Primary Examiner—A. Michael Chambers

Attorney, Agent, or Firm—Watts, Hoffmann, Fisher & Heinke Co.

[57] ABSTRACT

An altitude compensation unit for governing the combustion mixture in an automotive vehicle engine carburetor in response to changes in altitude above a predetermined altitude comprising a housing, an aneroid bellows anchored to the housing, and a force balancing pressure transducer valve fixed with respect to the housing. The transducer valve procides an output fluid pressure which varies in relation to the value of a force applied to the valve, with the output pressure force and the input force acting in opposition to each other on a valve transducer element. The transducer element is disposed in a predetermined position when the forces are balanced. A force transmission member supported by the housing transmits force between the capsule and the transducer element. A transducer output pressure responsive actuator alters the combustion mixture in response to output pressure from the transducer.

9 Claims, 4 Drawing Figures

ELEVATION RESPONSIVE AUTOMATIC VEHICLE CONTROL SYSTEM

DESCRIPTION

1. Technical Field

The present invention relates to automotive vehicle engine combustion controls and more particularly relates to controls for altering the supply of combustion air to the engine in response to operation of the vehicle at greater than a predetermined elevation above sea level.

2. Background Art

Drivability of gasoline engine powered automobiles and trucks has been impaired as a result of emissions control and/or fuel management systems being subjected to operating conditions beyond their optimum design conditions. Engine emission levels also tend to increase undesirably in such circumstances. For example, it has been observed that certain engines cease operating as they should at elevations several thousand feet above sea level. Apparently the reduced atmospheric pressure, or air density, ambient the vehicle affects the engine systems so that an unduly rich fuel-air combustion mixture is burned. The result is that engine performance suffers causing reduced "drivability" of the vehicle and emissions are increased.

There are a number of population centers in the world where the elevation is sufficient to adversely affect drivability all the time. Even when a vehicle is only occasionally driven at high elevations, drivability problems are nevertheless encountered which can be troublesome to the vehicle operator.

In order to obviate altitude related drivability and emissions problems the prior art proposed using mixture varying valves actuated by an aneroid capsule. The mixture valves were constructed so that the valve was actuated from a predetermined position as the sensed vehicle elevation increased above a predetermined level. The valve operated to create a leaner fuel-air mixture.

These devices were expensive, difficult to maintain in calibration and unreliable in use. The aneroid capsule extended and retracted appreciably in response to changed atmospheric pressure. During at least part of the capsule motion the valve was driven by the capsule through a range of motion. The typical aneroid capsule is an expansible thin walled metal bellows having one or more convolutions. Such bellows have spring rates which vary appreciably as the bellows extension changes. Moreover, the spring rates and their varying characteristics are not necessarily consistent from bellows to bellows. Still further, these bellows exhibit hysteresis effects when cycled through successive pressure changes against a load such as a mixture control valve.

Because of hysteresis, the devices tended to drift out of calibration during use with the degree of drift depending on spring rate and the frequency and extent of valve actuation.

Attempts to design aneroid capsule actuated mixture control valves which obviated these problems resulted in complicated, expensive assemblies which ultimately did not perform in a satisfactory way.

DISCLOSURE OF THE INVENTION

The present invention provides a new and improved vehicle elevation responsive valve controlling system wherein a control valve for governing the mixture of combustion air and fuel to the engine is operated in response to changes in sensed atmospheric pressure ambient an aneroid capsule without being affected by alterations in the capsule spring rate created by capsule extension and retraction or by capsule created hysteresis effects.

According to the invention the control valve is actuated in response to the sensed change in force exerted by an aneroid capsule subjected to varying atmospheric pressures without materially changing the degree of deformation of the capsule. The aneroid capsule is subjected to a change in atmospheric pressure causing an incremental change in capsule extension but the valve controlling system operates to return the capsule to its original configuration as the control valve position is adjusted. Thus, the capsule shape remains essentially unchanged throughout the range of operation of the control system.

In a preferred embodiment of the invention a combustion mixture controlling valve is operated from the pressure output of a controller valve which is in turn mechanically linked to the aneroid capsule. When atmospheric pressure ambient the capsule is reduced below a predetermined level, indicative of a predetermined vehicle altitude above sea level, the capsule force transmitted to the controller valve operates the controller valve to produce an output pressure for actuating the mixture control valve.

The degree of capsule extension changes incrementally when the capsule force is first applied to the controller valve. The resultant controller valve output pressure is utilized to produce a mechanical force which is applied to the aneroid capsule to oppose the incremental capsule extension or retraction. This feedback force returns the capsule to its initial configuration so that the degree of capsule extension is unchanged for any given atmospheric pressure in the operational pressure range.

Since the mixture control valve actuating device is so constructed and arranged that the aneroid capsule maintains a substantially constant extension throughout the range of sensed atmospheric pressures at which the mixture control valve is actuated, the new control system is not adversely affected by variable spring constants and hysteresis effects which would otherwise be exhibited by the aneroid capsule.

The preferred and illustrated control system is constructed and arranged so that the system is formed from relatively few parts which are compactly arranged and easily assembled. In particular the controller valve and the mixture control valve are formed using a single rubber-like flexible member supported on a one piece valve housing fixed to an aneroid capsule supporting case. Atmospheric air is supplied to the valves and the case through a common passage.

Other features and advantages of the invention will become apparent from the following description of preferred embodiments and from the drawings which form part of the specification.

BEST MODE FOR CARRYING OUT THE INVENTION

Figure 1:
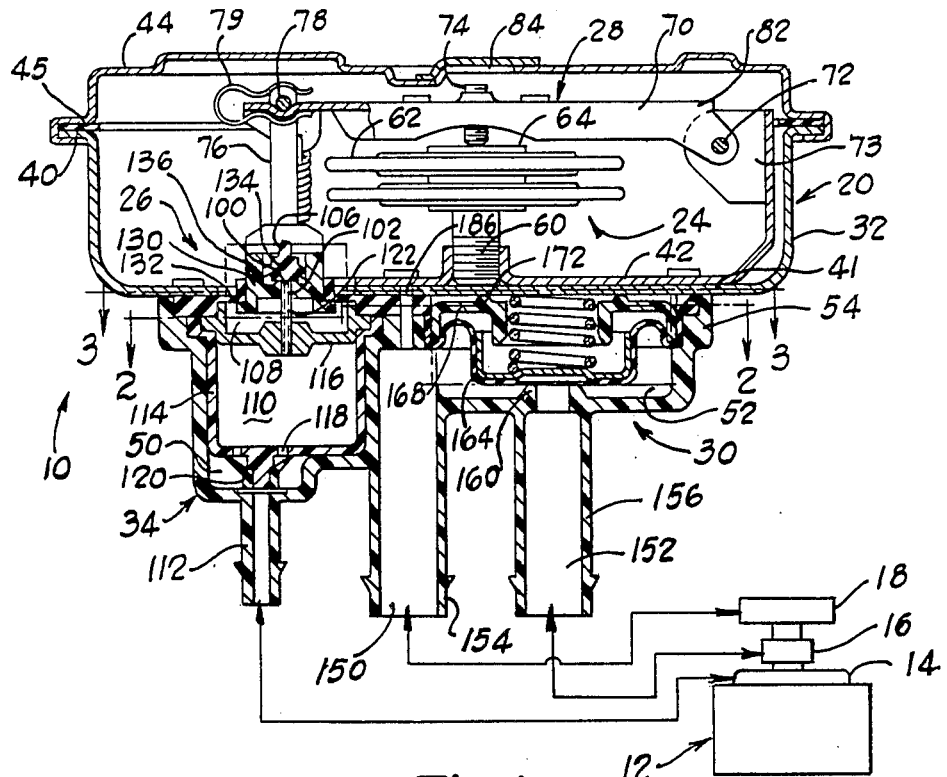
FIG. 1 is a cross sectional view of the control system constructed according to the present invention.

An elevation responsive valve controlling system 10 for controlling the fuel-air combustion mixture delivered to the engine 12 of an automotive vehicle is illustrated by the drawings. The system 10 is illustrated as used on a carbureted internal combustion engine of an automotive vehicle, such as an automobile or truck. The engine 12 is schematically illustrated as including an intake manifold 14, a carburetor 16 and an air cleaner 18 situated to filter atmospheric air passing into the engine 12 through the carburetor 16 and the intake manifold 14.

The system 10 functions to detect ambient atmospheric pressure levels indicative of vehicle elevation exceeding a predetermined height above sea level (for example, 4,000 feet) and to alter the ratio of fuel and air introduced to the engine to compensate for the rarefied atmospheres encountered at such elevations. As the elevation above sea level increases above the predetermined level the sensed reduction in barometric pressure leans the fuel-air mixture whereas decreases in elevation below the predetermined level enriches the fuel-air mixture.

The illustrated system 10 includes a support housing assembly 20 for a barometric sensor 24, a regulator valve assembly 26, a force transmitting member 28 for linking the sensor 24 with the valve assembly 26, and a combustion mixture control valve 30 which is operated from the output of the regulator valve assembly 26.

The support housing assembly 20 includes a case 32 and a valve support body 34 rigidly connected together. The case 32 houses the barometric sensor 24 and the force transmitting member 28 while the valve support body 34 houses the regulator valve assembly 26 and the control valve 30. The case 32 provides an enclosed space for the sensor 24 and force transmitting member 28 so that entry of atmospheric airborne dirt and dust particles are excluded from the case. The case 32 is formed by a stamped sheet metal cup having a flared open end 40, a generally planar base section 41 and an assembly support plate 42. A sheet metal cover member 44 is tightly crimped about the end 40. A gasket 45 is preferably clamped between the case and cover to effectively seal their juncture.

The body 34 is formed from a molded plastic member and defining a regulator valve assembly receiving cavity 50 and a combustion mixture control valve receiving cavity 52 which are disposed side by side in the body and open within a surrounding peripheral mounting flange section 54. The flange section 54 is connected to the cup base section 41 and the support plate 42 by suitable fasteners, such as rivets. The regulator valve assembly and the control valve are situated in their respective receiving cavities and secured in their assembled conditions between the cup base 41 and the body 34 when the cup and body are riveted together.

The barometric sensor 24 is formed by a hermetic aneroid bellows having a threaded base 60, a convoluted body 62 formed by thin sheet metal, preferably stainless steel, and a bellows head section 64 for transmitting force to and from the force transmitting member 28. The base 60 is threaded into a tapped opening in the plate 42 to fix the bellows firmly in place in the case 32. The bellows is conventionally constructed in that it is initially filled with a suitable gas under predetermined pressure and temperature conditions and then sealed closed.

The force transmitting member 28 transmits forces between the bellows and the valve assembly 26 so that the valve assembly is actuated to function in response to sensed atmospheric pressure. The illustrated force transmitting member 28 includes a sheet metal lever 70 connected to the case 32 at one end by a pivot pin 72 and a clevice 73 formed integrally with the plate 42. The lever extends from the pin 72 beyond the bellows so that the projecting lever end is disposed adjacent and aligned with the valve assembly 26. A bearing screw 74 extends through a tapped screw support connected to the lever 70 and bears on the bellows head 64 so that forces are transmitted between the bellows and lever via the bearing screw 74. The projecting end of the lever 70 is connected to the valve assembly 26 by a linkage 76. The linkage 76 is fixed to the projecting end of the lever 70 by a pivot pin 78 and a spring clip 79. The opposite end of the linkage is secured to the valve assembly 26.

The preferred lever 70 has a U-shaped cross sectional shape formed by a straight body 80 and stiffening flanges 82 extending along opposite sides of the body. The pivot pin 72 extends through bearing holes in the flanges 82. A vibration damping tension spring 83 (see FIG. 4) is stretched between one lever body flange 82 and an ear 42a formed integrally with the support plate 42. The spring 83 maintains the lever body 80 biased toward a positon where the screw 74 maintains light contact with the bellows head when the vehicle is below the 4000 ft. elevation.

The system 10 is calibrated in an atmosphere having a predetermined pressure, for example standard atmospheric air pressure at 4,000 feet above sea level. When the system 10 has been placed in such an atmosphere, the bearing screw 74 is turned by a screwdriver inserted through a small calibration opening 84 in the cover member 44 adjacent the screw. The bearing screw is turned until the output pressure from the regulator valve assembly 26 is just sufficient to actuate the control valve 30. The access opening 84 is then covered by an adhesive label, or tape, to seal the access opening closed against the possibility of atmospheric airborne particles ambient the cover entering the case 32.

The regulator valve assembly 26 is a force responsive pressure balanced type pressure regulator which communicates with a source of operating pressure and with ambient atmospheric air to produce an output pressure level which varies between that of the source pressure and atmospheric air pressure. The degree of force input to the regulator valve by the lever 70 governs the pressure level output from the regulator valve assembly 26 to the control valve 30. The regulator valve assembly is constructed and arranged so that the operating pressure output from the regulator valve assembly reacts against and balances the force transmitted by the bellows to the lever. Accordingly, the bellows extends or retracts only incrementally from a given, or normal, operating position to change the output from the pressure regulator valve assembly. The changed output pressure is applied to the lever to return the bellows to the normal operating position.

The regulator valve assembly 26 includes a source pressure port 100, a vent port 102, and valving structure 106 which is operated to communicate one or the other, or neither port, to an output pressure chamber 108. The vent port 102 communicates with atmospheric air in the case 32. The source pressure port 100 communicates with the engine intake manifold 14 via a vacuum reservoir 110 formed in the valve housing. Thus the valve assembly operating pressure source is the engine intake manifold and the reservoir 110 which coact to provide a continuous and substantial vacuum pressure to the source port 100.

As illustrated by FIG. 1, engine intake manifold vacuum is communicated to the valve housing 34 via a suitable hose and a hose nipple 112 molded into the valve housing and opening in the base of the cavity 50.

The vacuum reservoir 110 is formed between nested cups 114, 116 disposed in the cavity 50. The base or closed end of the cup 114 is spaced from the base of the cavity 50 and is provided with openings 118 communicable with the intake manifold via a check valve 120. The check valve 120 is formed by a rubber-like member having a cylindrical support body and a supple, flexible skirt having a continuous outer peripheral portion biased into contact with the cup base and surrounding the openings 118. The valve body is supported on a solid pin-like projection molded into the cup base and extending to the base of the cavity 50. So long as the engine intake manifold vacuum is greater than the vacuum in the reservoir 110, the reservoir 110 is evacuated through the openings 118 past the check valve skirt to the intake manifold. If the intake manifold vacuum should at any time become less than the reservoir vacuum the check valve skirt is urged into sealing contact with the cup base and blocks the openings 118 to prevent airflow into the reservoir 110. The cup 114 is preferably formed from molded plastic although other materials could be used.

The cup 116 is nested in the open end of the cup 114 to close the cup 114 and thus form the reservoir 110 between the bases of the respective cups. The cup 116 is preferably formed from die cast metal, but could be molded plastic. The cup 116 supports a small tube 122 which extends through the base of the cup 116 and opens in the vacuum reservoir. The tube 122 extends from the base of the cup 116 to the valve structure 106 with the projecting end of the tube defining the source port 100.

In some applications the reservoir 110 may not be considered essential to operation of the system 10 and, in such applications the reservoir 110 may be omitted. In such systems the reservoir can be dispensed with by omitting the cup 114 and the associated check valve components.

The valving structure 106 is situated across the open end of the cup 116 and projects a short distance into the case 32 via an opening 124 in the base 42. The valving structure 106 includes a valve control member 130 centered over the cup 116, a diaphragm 132 carrying the control member, and a valve element 134 which, in the preferred embodiment, is formed integrally with the diaphragm 132. The diaphragm 132 extends across the open end of the cup 116 and is maintained in sealing engagement with the cup lip. The diaphragm is in tight sealing engagement with the outer periphery of the control member 130 so that the diaphragm and control member form, with the cup 116, the output pressure chamber 108. The control member 130 is an annular body having a central opening which forms the vent port 102. The tube 122 extends loosely through the control member vent port 102 to a position where the source port end of the tube can be closed by the valve element 134. The vent port 102 in the control member 130 is formed by an upstanding lip confronting the valve element 134. The lip is sealingly engagable with the valve element 134 to block the vent port.

When the source port 100 and the vent port 102 are disposed in a common plane they are both closed by the valve element 134 and the pressure in the output chamber 108 is maintained constant. When the control member 130 is moved in a direction away from the base of the cup 116 the vent port 102 remains in sealing contact with the valve element 134 while the source port 100 is opened for communication with the output pressure chamber 108 to partially evacuate the output pressure chamber and thus reduce the output pressure level. When the valve control member 130 is moved in the opposite direction the source port 100 contacts and is closed by the valve element 134 while the vent port 102 moves away from the valve element and is opened to the atmosphere in the case 32 via the opening 124. Atmospheric air thus flows into the output chamber 108 (via the space between the vent port 102 and the tube 122) and increases the pressure in the output chamber.

The valve control member 130 is connected to the force transmitting member 28 and is incrementally movable by the member 28 and the bellows 24 to control operation of the valve assembly 26. The member 130 includes a pair of upstanding fingers 136 which extend through the case opening 124 and are secured to the link 76 so that the valve control member 130 is movable relative to the case 32 by the link. The valve element 134 is integrally molded with the diaphragm 132 and is connected to the diaphragm by a pair of thin straps of diaphragm material (indicated by the reference character 138; see FIG. 3). The valve control member fingers 136 extend into the case 32 on opposite sides of the straps through semicircular openings in the diaphragm material. The semicircular openings permit atmospheric airflow to and through the vent port 102, but since the diaphragm is sealed about the control member periphery there is no direct communication between the atmospheric air and the output chamber into the openings.

When the vehicle is operating at an elevation exceeding 4,000 feet above sea level a further sensed increase in elevation results in an incremental extension of the bellows. The extension shifts the lever 70 slightly to move the control member 130 toward the case 32. This reduces the vacuum pressure level in the output chamber 108, increasing the differential pressure acting on the control member 130 and the diaphragm 132. The change in the differential pressure across the diaphragm and control member opposes the control member motion and returns the control member to its original position where both the vent port and the source port are closed. This occurs when the force exerted by the bellows on the lever is balanced by the countervailing force exerted by the control member 130 on the lever. Accordingly the bellows is returned to its initial position.

When the vehicle elevation is reduced again the bellows force transmitted to the lever 70 is reduced because of the increased atmospheric pressure. Thus the force exerted by the valve control member 130 on the lever tends to incrementally retract the bellows. This incremental motion is accompanied by control member movement away from the case 32 so that the source port is closed by the valve element 134 and the vent port 102 is opened. The pressure in the output chamber pressure thus increases toward atmospheric pressure. This reduces the differential pressure force acting on the diaphragm and control member thus reducing the force transmitted through the lever to the bellows. Accordingly the incremental reduction in bellows height is eliminated as the bellows returns to its initial position where the forces reacting between the bellows and the valve control member are again balanced.

The output pressure from the chamber 108 is delivered to the control valve 30 via a flow channel, generally indicated by the reference character 140, to enable the operation of the control valve 30 by the valve assembly 26.

The control valve 30 functions to variably communicate a combustion air inlet passage 150 with an outlet passage 152 to alter the fuel-air ratio of the combustion mixture flowing to the engine depending on sensed elevation. The inlet passage 150 communicates ambient atmospheric air which has passed through the engine air filter 18 to the valve 30 while the outlet passage 152 communicates with the carburetor 16 in a region of sub-atmospheric pressure. The valve 30 communicates the inlet and the outlet passages when the sensed vehicle elevation exceeds 4,000 feet so that atmospheric air is drawn into the carburetor via valve 30. The air flow to the carburetor reduces the amount of fuel induced into the combustion chambers and thus leans the fuel-air mixture and prevents deterioration of engine performance caused by operation in rarefied atmosphere.

In the illustrated system the inlet passage 150 is formed by a hose nipple 154 integrally molded into the valve support body 34 and having a central channel opening into the valve cavity 52. The nipple 154 is communicated to atmospheric air via a suitable hose leading to the engine air filter. The outlet passage 152 includes a hose nipple 156 molded to the valve housing for communicating atmospheric air from the valve cavity 52 to the carburetor via a suitable connecting hose or hoses.

The valve 30 comprises a valve seat 160 extending about the outlet passage opening into the base of the cavity 52 and a control valving member which moves relative to the seat 160 to govern the flow through the passages 150, 152. The illustrated control valving member includes a diaphragm 164, a diaphragm cup 166 fitted within the diaphragm, a guide member 168 and a biasing spring 170.

The guide member 168 is clamped between the case 32 and a shoulder of the valve cavity 52 and secures the outer periphery of the diaphragm 164 in place. The spring 170 extends through a guide opening in a central hub of the guide member 168 from the case 32 to the diaphragm cup 166. The guide member is formed with a circular array of projections 172 engaging the cup base 42 for enabling free communication between the output pressure chamber and one side of the diaphragm 164 via the flow passage 140. The opposite side of the diaphragm 164 communicates with ambient atmospheric air via the passage 150 so that the diaphragm 164 is acted upon by a differential pressure force determined by the difference between atmospheric air pressure and the pressure in the output chamber 108. The spring 170 maintains the valve 30 in the normally closed position and is constructed and arranged to resist opening the valve 30 until the differential pressure across the diaphragm 64 overcomes the spring force and enables opening of the valve 30.

In the illustrated system 10 the area of the seat 60 is sufficiently large, and the spring 170 is sufficiently light, that the valve 30 opens abruptly and fully when the vehicle reaches the predetermined altitude. It should be apparent that by strengthening the spring the valve 30 could be caused to modulate the flow of air to the carburetor as the altitude increased.

Figures 2, 4:
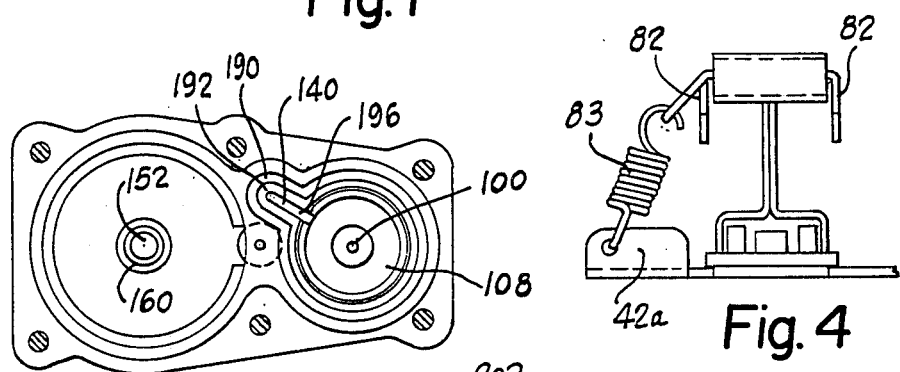
FIG. 2 is a cross sectional view seen approximately from the plane indicated by the line 2—2 of FIG. 1; and, FIG. 3 is a cross sectional view of a portion of the system of FIG. 1 seen approximately from the plane indicated by the line 3—3 in FIG. 1.
FIG. 4 shows a side view of a one lever body flange and ear integrally formed with a support plate.
Figure 3:
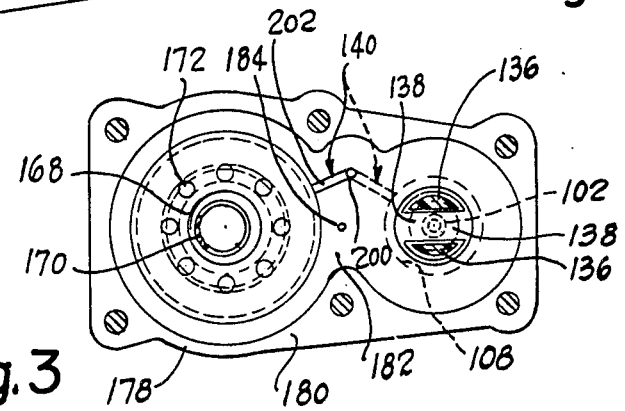

The system 10 is constructed and arranged to facilitate efficient manufacturing assembly utilizing relatively few individual parts. As best illustrated by FIGS. 2 and 3 the diaphragms 132, 164 are formed on a common rubber-like molded member 178 defining a peripheral sealing flange 180 clamped in sealing engagement between the case 32 and the valve housing 34 and a web section 182 extending between the diaphragms.

The web section 182 is constructed to provide for communication between the atmospheric air passage 150 and the interior of the case 32 as well as to provide for communication between the regulator valve output pressure chamber and the air control valve. Atmospheric air is provided to the case interior via an atmosphere port 184 extending through the web section 182 between the passage 150 and an aligned port 186 (FIG. 1) in the case 32. The ports 184, 186 are sufficiently large to enable free flow of atmospheric air into the case to supply the venting flow requirements of the regulator valve 26 without altering the degree of extension of the bellows 62. Since the supply passage 150 supplies atmospheric air which has passed through the engine air cleaner 18, the entry of airborne particulate matter into the case 32 is minimized.

The web section 182 and the cup 116 are constructed to form the passage 140. The cups 114, 116 are formed having respective nesting ear-like projections 190, 192 which are received in a conforming recess in the valve body 34 when the cups are assembled to the body. The projection 192 defines a flow groove 196 opening into the regulator valve output chamber 108 and defining a portion of the flow passage 140. The groove 196 is aligned with a through port 200 and a groove 202 formed in the web 182 which extend between the groove 196 and the valve 30 to complete the passage 140. The projections 172 assure free communication between the passage 140 and the valve 30.

The nesting cup ears 190, 192 assure that the cups are properly aligned with each other, the body 34 and the diaphragm member. When the assembly is completed the diaphragm member 178 is clamped between the case 32 and the body 34 to assure that the passage 140 is sealed from the passage 150 and from the atmospheric air ambient the system 10.

Although only a single embodiment of the invention is illustrated and described in detail, the invention is not to be considered limited to the precise construction disclosed. Various adaptations, modifications and uses of the invention may occur to those skilled in the art to which the invention relates and the intention is to cover all such adaptations, modifications and uses which fall within the spirit or the scope of the appended claims.

I claim:

1. An altitude compensating fuel mixture controller for a carbureted automotive vehicle engine comprising:
   (a) a supporting housing;
   (b) an aneroid bellows connected to said housing;
   (c) a control valve assembly having a pressure input port connected to a pressure source related to an intake manifold pressure, a vent port connected to atmosphere, a pressure output chamber, and valving structure movable from a predetermined position to alter communication between said output chamber and one of said input and vent ports to change an output pressure in said output chamber, said valving structure defining a differential pressure responsive means having a region exposed to atmospheric pressure and another region exposed to the output pressure such that said differential pressure responsive means is acted upon by differential pressure forces whose magnitudes vary depending on the difference between ambient atmospheric pressure and the output pressure;

(d) a force transmitting member supported by said body for transmitting force between said aneroid bellows and said valving structure, and;

(e) a pressure actuated fuel mixture controlling valve communicating with said output port and supported by said body;

(f) said force transmitting member effective to transmit incremental motion of said bellows to said valving structure in response to sensed atmospheric pressure reduction below a predetermined level indicative of a vehicle altitude above a predetermined altitude such that a biasing force is applied to said differential pressure responsive means;

(g) said output pressure changing to produce a feedback pressure force acting on said differential pressure responsive means to oppose said incremental bellows motion and to return said valving structure to said predetermined position, said feedback pressure force reacting against said bellows force via the force transmitting member to limit the degree of extension and retraction of said bellows to incremental amounts from a predetermined degree of extension.

2. The controller claimed in claim 1 wherein said supporting housing comprises a case member for housing said bellows and a valved support body connected to said case member and supporting said control valve, said valve support body defining a vacuum reservoir communicating with said pressure input port and with an engine intake manifold, and further including a check valve between said reservoir and said manifold.

3. The controller claimed in claim 1 wherein said supporting housing comprises a valve support body and a case member for housing said bellows, said valve support body defining first and second valve supporting cavities for said control valve assembly and said fuel mixture controlling valve, respectively, said valve support body rigidly connected to said case member to maintain said valve and said valve assembly in their assembled conditions.

4. The system claimed in claim 3 wherein said control valve assembly valving structure and said fuel mixture controlling valve each includes a flexible diaphragm member movable in response to applied differential pressure applied thereto, said diaphragm members formed continuously with a resilient sealing flange extending peripherally about the diaphragms and a web section extending between the diaphragms within said flange, said flange, web section and diaphragms clamped between said case member and said valve support body.

5. The controller claimed in claim 4 further including a flow channel for communicating pressure from said control valve assembly to said fuel mixture controlling valve, said flow channel defined in part by said web section.

6. The controller claimed in claim 4 wherein said valve support body defines an atmospheric air passage communicating with ambient atmospheric air and further including an atmospheric air port in said web section communicating said atmospheric air passage to the interior of said case member.

7. An altitude compensation unit for governing the combustion mixture in an automotive vehicle engine carburetor in response to changes in altitude above a predetermined altitude comprising:

(a) a housing;

(b) an aneroid capsule anchored to said housing;

(c) a force balancing pressure transducer means fixed with respect to said housing, said transducer means defining a differential pressure responsive element and being effective to provide an output fluid pressure which varies in relation to the value of forces applied to said pressure differential pressure responsive element;

(d) said differential pressure responsive element having a region exposed to an input pressure and another region exposed to said output fluid pressure, said input pressure and said output pressure generating forces on said associated regions which act in opposition to each other, said differential pressure responsive element disposed in a predetermined position when all forces on said element are balanced regardless of their magnitude;

(e) force transmission means supported by said housing for transmitting a force between said capsule and said differential pressure responsive element, said transducer means operative to generate a feedback pressure force on said differential pressure responsive element to oppose said capsule generated force such that when said forces on said differential pressure responsive element are balanced, said force transmission means maintains said capsule at a predetermined extension regardless of the magnitude of said forces and atmospheric pressure; and, (f) a transducer output pressure responsive actuator for altering the combustion mixture.

8. The unit claimed in claim 7 wherein said housing comprises a case member defining a chamber for said aneroid capsule and a support body for said pressure transducer means and said actuator, said actuator and said differential pressure responsive element each comprising a flexible diaphragm, said diaphragms formed continuously with a single resilient flexible member clamped in sealing relationship between said case member and said support member.

9. The unit claimed in claim 8 wherein said flexible member defines a peripheral sealing flange surrounding said diaphragms and a web section extending between said diaphragms.

* * * * *